United States Patent
Kuhn et al.

[19]

[11] Patent Number: 6,155,951
[45] Date of Patent: Dec. 5, 2000

[54] TOROIDAL DRIVE

[75] Inventors: Walter Kuhn, Friedrichshafen; Jürgen Wafzig, Eriskirch; Martin Grumbach, Friedrichshafen, all of Germany

[73] Assignee: ZF Friedrichshafen AG, Friedrichshafen, Germany

[21] Appl. No.: 09/341,343

[22] PCT Filed: Jan. 27, 1998

[86] PCT No.: PCT/EP98/00432

§ 371 Date: Jul. 8, 1999

§ 102(e) Date: Jul. 8, 1999

[87] PCT Pub. No.: WO98/34051

PCT Pub. Date: Aug. 6, 1998

[30] Foreign Application Priority Data

Jan. 31, 1997 [DE] Germany .......................... 197 03 544

[51] Int. Cl.⁷ .................................................. F16H 37/02
[52] U.S. Cl. .......................................... 475/216; 475/207
[58] Field of Search .................................. 475/207, 216; 192/70.12, 854 A

[56] References Cited

U.S. PATENT DOCUMENTS

| | | | |
|---|---|---|---|
| 4,628,766 | 12/1986 | De Brie Perry | 475/216 |
| 4,693,134 | 9/1987 | Kraus | 74/690 |
| 4,997,074 | 3/1991 | Larson et al. | 192/85 AA X |
| 5,194,052 | 3/1993 | Ueda et al. | 475/66 |
| 5,230,670 | 7/1993 | Hibi | 475/216 X |
| 5,232,414 | 8/1993 | Fellows et al. | 475/216 |
| 5,238,460 | 8/1993 | Esaki et al. | 475/216 X |
| 5,401,221 | 3/1995 | Fellows et al. | 475/214 |
| 5,687,821 | 11/1997 | Lorriette | 192/85 AA X |
| 5,782,433 | 7/1998 | Goi et al. | 475/216 X |
| 5,860,888 | 1/1999 | Lee | 475/216 X |
| 5,921,882 | 7/1999 | Hoge et al. | 475/216 X |

FOREIGN PATENT DOCUMENTS

| | | |
|---|---|---|
| 0 043 184 A2 | 1/1982 | European Pat. Off. . |
| 0 078 124 A1 | 5/1983 | European Pat. Off. . |
| 0 120 636 A1 | 10/1984 | European Pat. Off. . |
| 0 271 343 A1 | 6/1988 | European Pat. Off. . |
| 0 389 908 A2 | 10/1990 | European Pat. Off. . |
| 1 775 908 | 1/1972 | Germany . |
| 2 807 971 | 8/1979 | Germany . |
| 34 41 616 C2 | 5/1985 | Germany . |
| 405026321A | 2/1993 | Japan ..................................... 475/216 |
| 2 200 175 | 7/1988 | United Kingdom . |
| 91/08406 | 6/1991 | WIPO . |
| 92/10697 | 6/1992 | WIPO . |
| 94/04849 | 3/1994 | WIPO . |
| 95/14183 | 5/1995 | WIPO . |
| 96/35063 | 11/1996 | WIPO . |

OTHER PUBLICATIONS

Japanese Abstract, "Power Transmission Shaft Structure", Publ.No. 073 32 458 A, dated Dec. 22, 1995.

Japanese Abstract, "Power Transmission Device for Vehicle", Publ.No. 081 59 235 A, dated Jun. 21, 1996.

Primary Examiner—Charles A. Marmor
Assistant Examiner—Roger Pang
Attorney, Agent, or Firm—Davis and Bujold

[57] ABSTRACT

The invention relates to a transmission in which the input power is either directly transmitted by an input shaft (2) to an output shaft (17) or indirectly transmitted via a continuously variable transmission (5), in particular a transmission with toroidal races (6, 8 and 7, 9 respectively) which work together in pairs and between which rotate rolling bodies (10) and a planetary gear (18). According to the invention the first power range corresponds to a first forward travelling speed range in which the input power is transmitted via the variator (5) to the output shaft (17) and the planetary gear (18) revolves as a unit, and one other power range follows the first power range and corresponds to a range of higher forward travelling speeds in which the input power is divided and supplied to the planetary gear directly and via the variator (5) which totals and transmits it to the output shaft (17). By the plurality of possible arrangements, in particular of the variator and planetary gear, the transmission according to the invention is suitable for use in practically all vehicles.

6 Claims, 4 Drawing Sheets

TOROIDAL DRIVE

The invention relates to a transmission in which the input power either is directly transmitted by an input shaft to an output shaft or is transmitted via a continuously variable transmission, especially a transmission having toroidal races that work together in pairs and between which rotate rolling bodies and a planetary gear.

BACKGROUND OF THE INVENTION

Continuously variable transmissions, having an input and an output shaft and a variator consisting of at least two toroidal discs with toroidal races between which rolling bodies run on, are to be understood as being known from the literature in multiple embodiments.

DE-A 28 07 971 shows a simply designed toroidal drive having one input and one output shaft and two discs which accommodate between them rolling bodies. The rolling bodies are mounted in supports and can be tilted via an axially movable drum. In this manner the reduction ratio is changed.

Examples of continuously variable transmissions having two power ranges or operation systems are known from European patents 0 043 184 and 0 078 124. In the transmission of EP-A 0 078 124, the input power is conveyed in a first ratio range, via a wave train and a variator, to a summarizing transmission in the form of a planetary gear. Depending on the prevalent speed ratios, the transmission is in a geared neutral state or reduction ratios of the whole transmission are produced for reverse and low forward speeds. In a second ratio range, the input power is directly transmitted via a variator to the output shaft. This transmission has the disadvantage that the variator is operated with power distribution in the first power range so that the total effectiveness deteriorates.

SUMMARY OF THE INVENTION

The problem, on which this invention is based, is to improve, with regard to the total effectiveness attained, a transmission of the above mentioned type which is operated in two power ranges. More than that, with fundamentally the same basic design, the transmission must be adaptable to different installation conditions.

By virtue of the multiplicity of possible arrangements, especially of the variator and of the planetary gear, the transmission, according to the invention, is adequate for use in practically all vehicles.

BRIEF DESCRIPTION OF THE DRAWING(S)

Other features essential to the invention and the advantages resulting therefrom are to be understood from the explanation that follows of several embodiments the transmission according to the invention. In the drawings:

FIG. 1 is a diagram of a transmission operable in several power ranges; and

FIGS. 2 to 8 present transmission diagrams showing different arrangements of a variator and of a planetary gear in relation to the input and output of the transmission.

DESCRIPTION OF THE PREFERRED EMBODIMENT(S)

Figure 1:
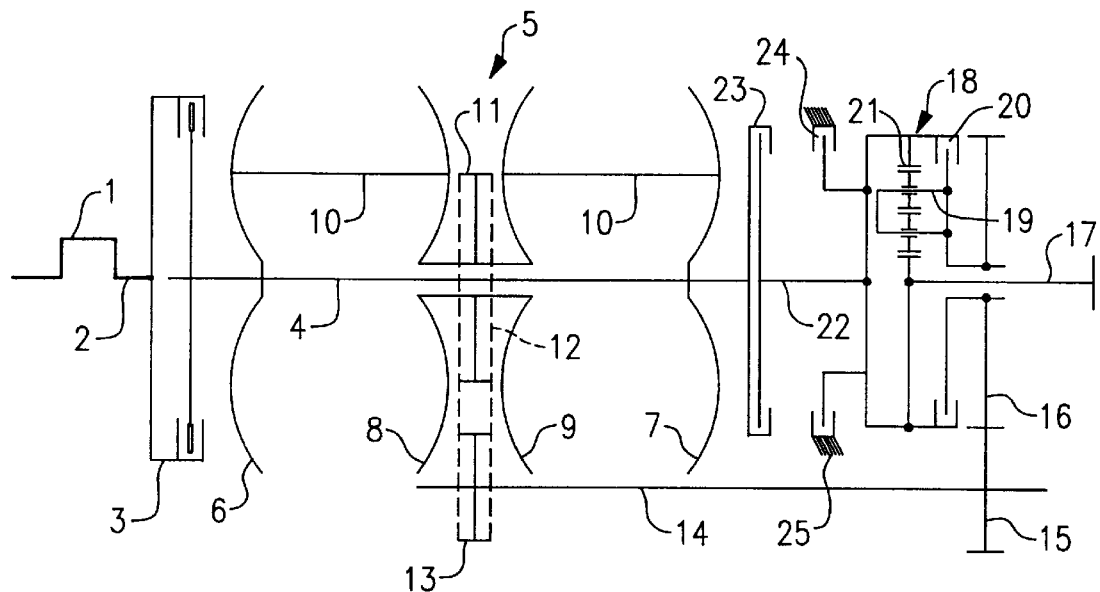

A motor 1 indicated in FIG. 1 drives an input shaft 2 which can be connected, via a starting element 3, with a main shaft 4 of a continuously variable transmission, hereinafter called variator 5.

The starting element can be designed, e.g. as dry disc clutch. It is also possible to use a regulatable clutch which can be designed, e.g. as wet operating multi-disc clutch.

The variator 5 is a toroidal drive and has two outer toroidal discs 6 and 7 at its disposal, which work together in pairs with inner toroidal discs 8 and 9. Between the diagrammatically plotted toroidal races rotate several rolling bodies 10 of which only two are indicated in the drawing.

While the two outer toroidal discs 6 and 7 are non-rotatably connected with the main shaft 4, the two inner toroidal discs 8 and 9 are rotatably supported relative to the main shaft and non-rotatably connected with a sprocket wheel 11. The latter, via an input chain 12, is in driving connection with one other sprocket wheel 13 upon a lateral shaft 14. A gear 15 is non-rotatably situated at the end (to the right in the drawing) of the lateral shaft 14. Said gear 15 meshes with a gear 16 which is rotatably disposed in relation to an output shaft 17. The gear 16 is nonrotatably connected with a transmission element of a planetary gear 18, in this case with a web 19. A non-rotatable connection between the gear 16 and a ring gear 21 can be created by a clutch 20. The ring gear 21 is nonrotatably attached to an intermediate shaft 22 which (the same as the output shaft 17) lies coaxially in relation to the main shaft of the transmission 4. Between the main shaft 4 and the intermediate shaft 22 is inserted a clutch 23. In addition, the ring gear 21 can be stalled by a brake 24 in relation to the transmission housing 25.

The transmission explained allows operation in different ranges:

Reverse travel:

By engaging the brake 24 when the clutches 20 and 23 are disengaged, the direction of rotation of the output shaft 17 is adjusted opposite to the direction of rotation of the motor 1. The vehicle travels in reverse at higher speed reducing ratio when the starting element 3 is engaged. The variator 5 can remain set at a constant ratio or can also be shifted.

Neutral position:

By disengaging the clutches 8 and 20 and the brake 24 being disengaged, the output shaft 17 is freely rotatable relative to the remaining parts of the transmission. No power is transmitted to the output. If the starting element 3 is additionally disengaged, the main shaft 4 is also freely rotatable relative to the input shaft 2 (or crankshaft of the motor 1).

First forward travel range:

The planetary gear 18 is interlocked by engagement of the clutch 20 so that it rotates as a unit. The motor speed is transmitted via the variator 5 and the first transmission step (designed as chain drive) to the lateral shaft 14. One other ratio follows from here via the gears 15 and 16 (second transmission step) to the planetary gear 18 rotating as block. Depending on the setting of the ratio of the variator 5, the output shaft 17 is driven at different speed coinciding with the direction of rotation of the motor 1. The ratio of the whole transmission can be set continuously between two limit ratios of the first forward travel range.

Change of range:

If, in the first forward travel range, the end position of the variator 5 with its speed increasing ratio had been reached, a synchronous change between the first forward travel range and a second forward travel range and vice versa can follow, if necessary. This presupposes a corresponding design of the planetary gear 18 and of the other transmission elements. The range is changed by engaging the clutch 23 and simultaneously disengaging the clutch 20. By the actuation of the clutch, a torque distribution over the planetary gear 18 becomes effective. During the change of range, the torque direction reverses on the variator 5. The direction of rotation is maintained, while the power flow direction through the variator 5 reverses. The range can be changed by a load switch without interruption of traction.

Second forward travel range:

After a change of range has been completed, as explained above, the power flows through the variator 5 in opposite direction - in relation to the first forward travel range. This idle power is added to the motor power and, via the main and intermediate shafts 4 and 22, flows back to the planetary gear 18. The idle power, circulating over the variator 5, is variable and depends on the ratio of the variator. At the moment of the change of range, the components of the planetary transmission rotate at the same speed.

If the variator 5 is changed again from its end position, the speed of the web 19 of the planetary gear 18 becomes lower than the speed of the ring gear 21 rotating at motor speed. Hereby the speed of the output shaft 17 is increased compared to the motor speed. Thereby the total ratio of the transmission acts at high speed. The ratio of the whole transmission can also be here continuously changed between two limit ratios of the second forward travel range.

The ratio, in the planetary gear 18 and the remaining parts of the transmission, can be selected so that in the power distributed operation no idle power higher than the motor power flows through the variator 5. In particular, this means that only one part of the motor power with a relatively poor effectiveness is transmitted by the variator 5. The motor power and the idle power, circulating over the variator 5, are added up on the main shaft 4 and transmitted, via the engaged clutch 23 and the intermediate shaft 22, to the planetary gear 18.

Starting:

The starting element 3 can be designed as desired. Mainly considered for use are a hydrodynamic clutch, a hydrodynamic converter, a dry or oil-rotating friction clutch, a magnetic powder clutch, etc. Instead of the starting element 3, between the input shaft 2 and the main shaft 4 of the transmission, there can also be used for starting the other clutches 10 and 23 or also the brake 24 which, in any case, must be there for change of range and direction. In such a case, the starting element 3 can also be completely eliminated.

In special driving situations the starting element 3 can be controlled in a manner such that slip occurs. This can be convenient to dampen the torsion vibrations in the driving line.

Regarding the variator let it be complementarily observed that it can have one or, as plotted, also two power tractions.

Herebelow are explained, with the aid of the drawings corresponding to FIG. 2 to 8, advantageous modifications of the transmission, according to the invention, where the variator 5 and the planetary gear 18 are not disposed coaxially relative to each other.

Figure 2:
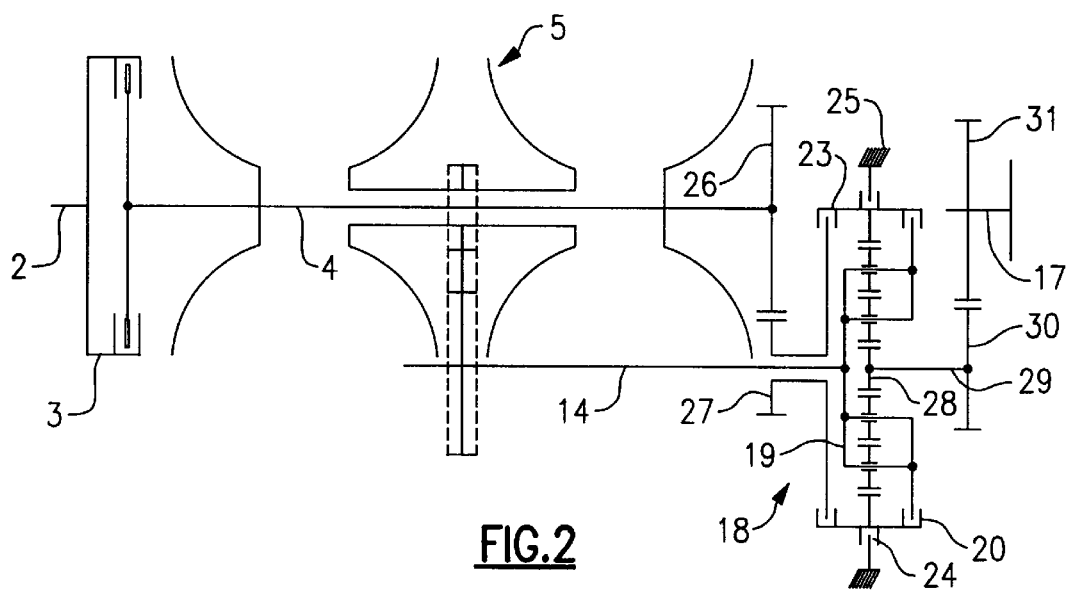

In the embodiment shown in FIG. 2, the planetary gear 18 is situated lying coaxially relative to the lateral shaft 14. A gear 26 of the main shaft 4 is in meshing connection with an idler gear 27 which is rotatably situated upon the lateral shaft 14. The clutch 23 with which the main shaft 4 can be connected with the planetary gear 18 is now integrated into the planetary gear 18. With the clutch 20 can be created a connection with the web 19 of the planetary gear. A sun gear 28 is part of a shaft 29 which is situated concentrically in relation to the lateral shaft 14 and carries a gear 30. It meshes with a gear 31 upon the output shaft 17 of the transmission.

Figure 3:
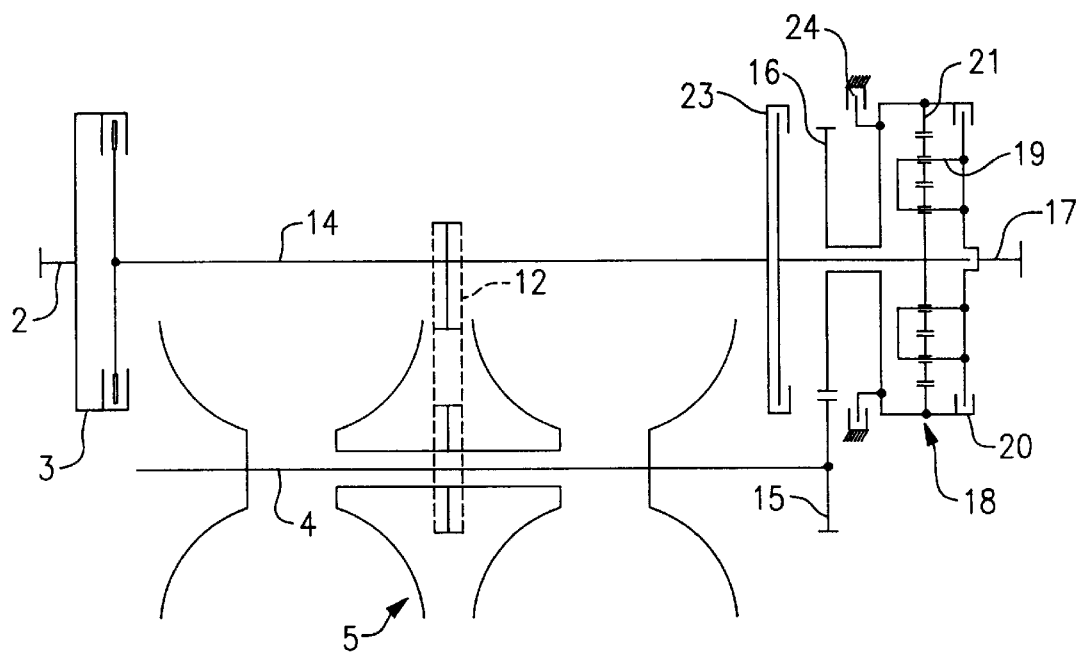

In the embodiment of FIG. 3, the variator is disposed horizontally at the side of a shaft 14. It is driven from the shaft 14, via the input connection 12, explained in relation to FIG. 1. The planetary gear 18 is homologously disposed compared to the one in FIG. 1. The ratio formed from the gears 15 and 16 is between the clutch 23 and the planetary gear 18. Accordingly, the gear 16 is non-rotatably connected with the ring gear 21 of the planetary gear. The web 19 drives the output shaft 17.

Figure 4:
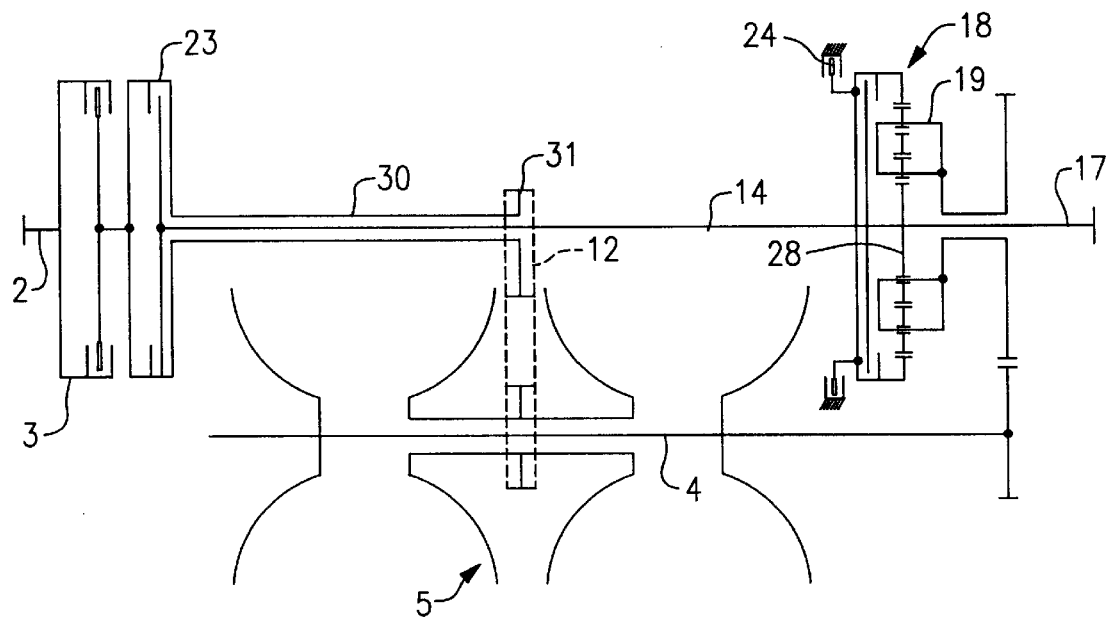

In the construction, according to FIG. 4, the starting element 3 and the clutch 23 are operated in tandem. If the clutch 23 is not engaged, the variator 5 is driven via the engaged starting element 3 and a hollow shaft 30 lying concentrically in relation to the shaft 14 and carrying on its right end a sprocket wheel 31 which, via the input chain 12, creates a connection to the input of the variator 5. Compared to the arrangement of FIG. 1, the intermediate shaft 22 is eliminated. If the clutch 23 is engaged, the planetary gear 18 is directly driven by the shaft 14. The output shaft 17 not only carries the sun gear 28 of the planetary gear, but is also directly connected with a component 32 of the clutch 20.

Figure 5:
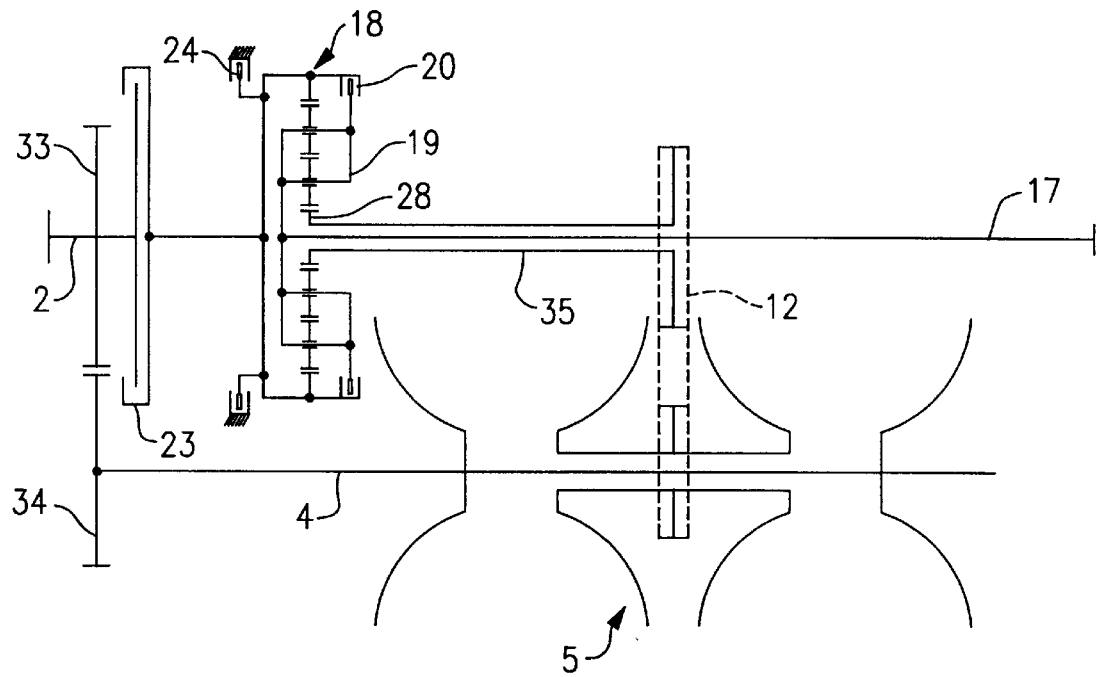

In the transmission diagrammatically shown in FIG. 5, the variator 5 is driven via an input ratio consisting of a gear 23 of the input shaft 2 and a gear 34 of the main shaft 4. A connection between the input shaft and the intermediate shaft 22 for driving the planetary gear 18 can be made by the clutch 23. Via the input chain 12, the variator 5 likewise is in driving connection with a hollow shaft 35 which on its end (to the left in the drawing) carries the sun gear 28 of the planetary gear 18. The input shaft 2, the intermediate shaft 2 and the output shaft 17 are coaxial relative to each other. The hollow shaft 35 lies concentrically relative to the output shaft 17. The output shaft 17 is driven via the web 19 of the planetary gear 18.

Figure 6:
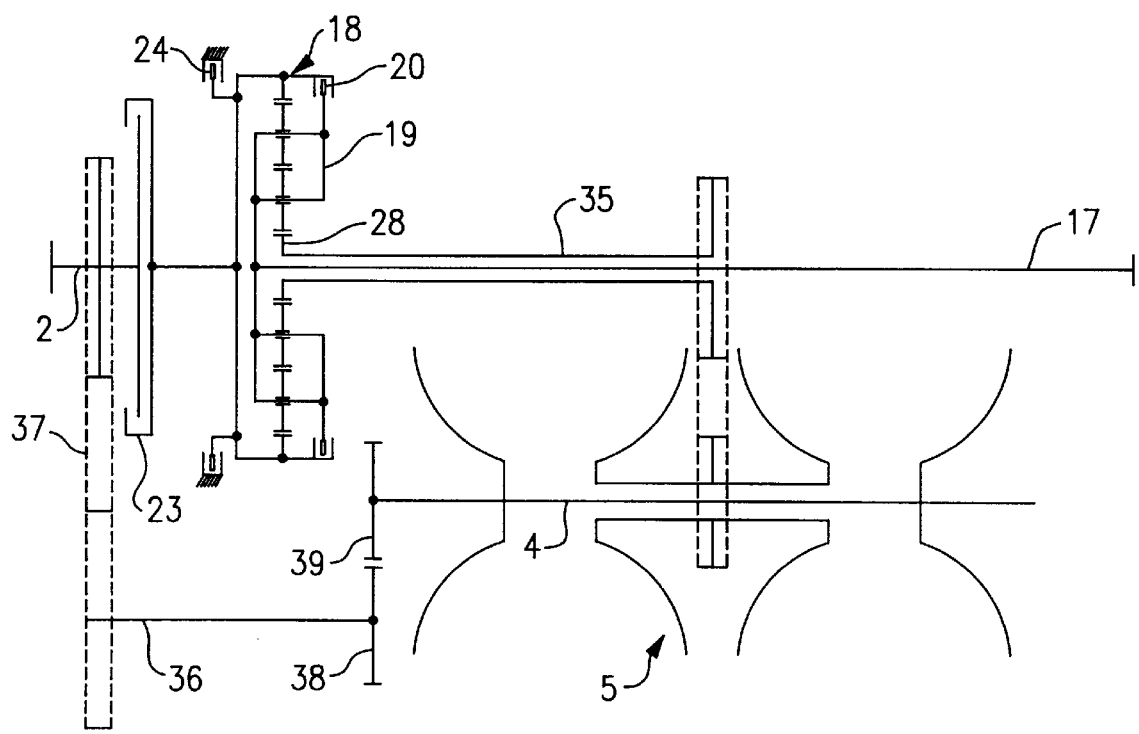

In the transmission diagrammatically shown in FIG. 6, the variator 5 is driven via an additional countershaft 36, which is in driving connection on one side with the input shaft 2 via an input connection 37 and on the other with the main shaft 4 via intermeshed gears 38 and 39. Regarding the remaining design, it coincides with the transmission according to FIG. 5. In both drafts (FIG. 5, FIG. 6) the brake 24 of the planetary gear 18 assumes the starting function.

Figure 7:
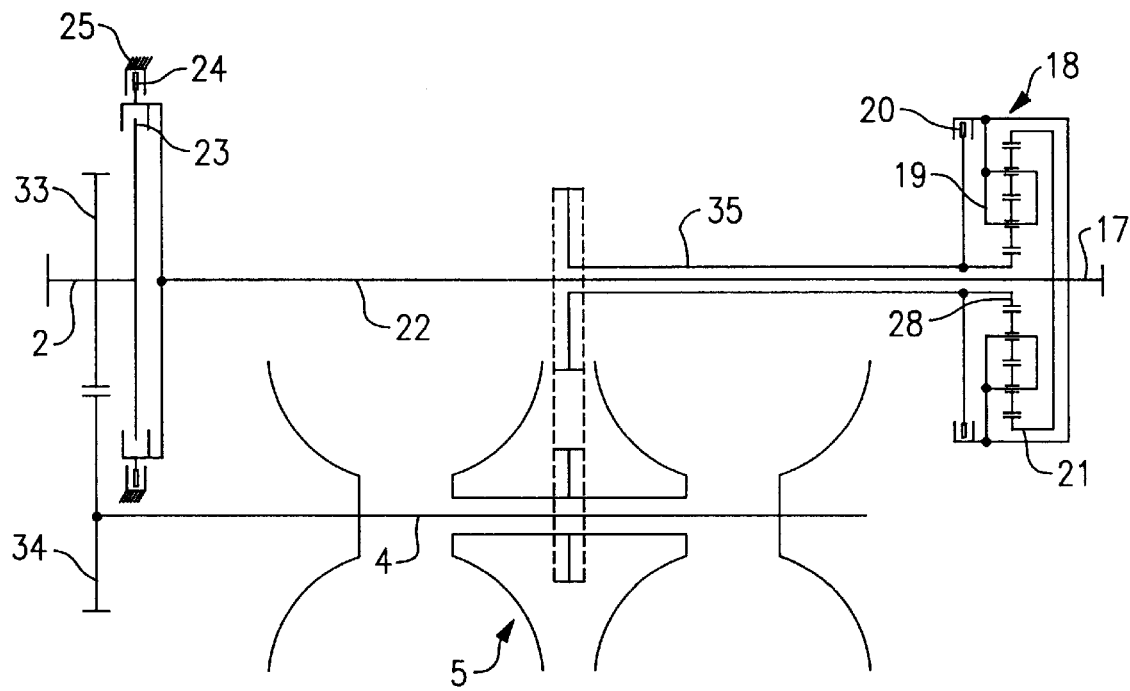

The transmission diagrammatically reproduced in FIG. 7 stands out by the coaxial position of the input shaft 2 of the intermediate shaft 22 nonrotatably connected with the ring gear 21 of the planetary gear 18 of the planetary gear 18 itself. The variator 5 is driven via the input ratio formed from the gears 33 and 34. The brake 24 and the clutch 23 are designed as a composite structural element. The brake 24 also assumes the starting function. The clutch 20 creates a non-rotatable connection between the hollow shaft 35 and the output shaft 17.

Figure 8:
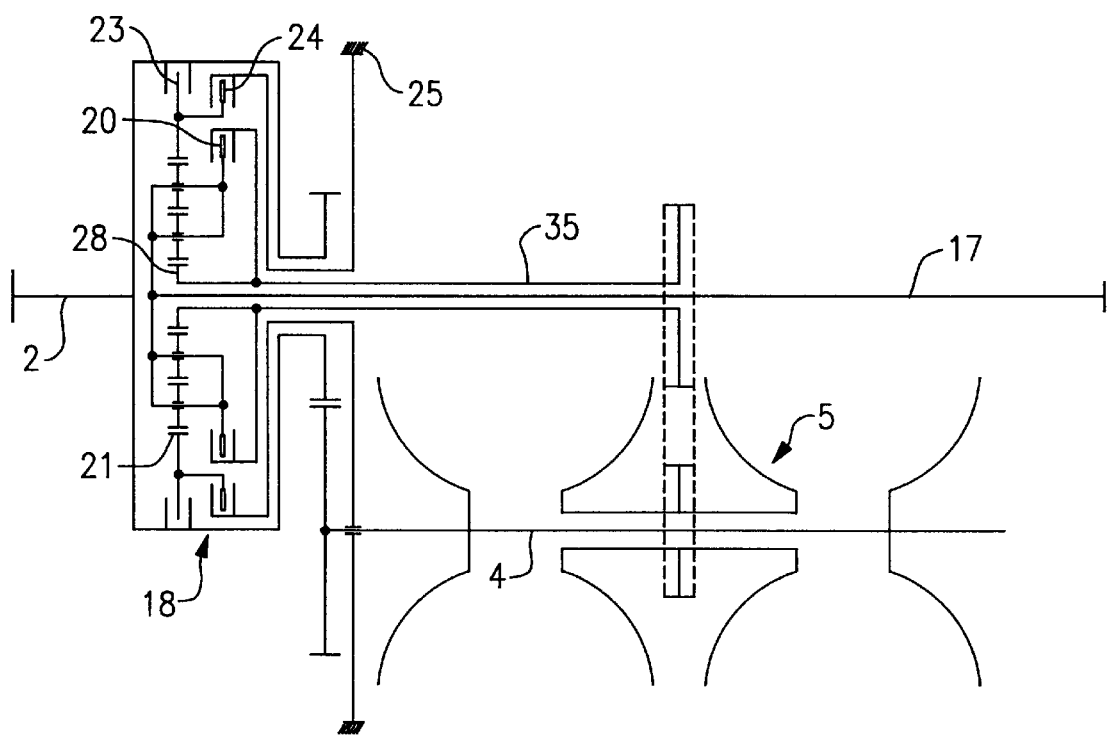

The diagram of the transmission in FIG. 8 shows that the planetary gear 18 lies coaxially relative to the input shaft 2 and output shaft 17. The variator 5 and the main shaft 4 are axially offset relative thereto. The clutches 20, 23 and 24 are integrated into the planetary 18.

What is claimed is:

1. A transmission in which input power, in a first power range, is transmitted by an input shaft (2) to an output shaft (17) via a continuously variable transmission in the form of a variator (5) having a main shaft (4) and toroidal races (6, 8 and 7,9 respectively) which work together in pairs and between which rolling bodies (10) rotate and in a second power range is transmitted via the continuously variable transmission (5) and a planetary gearing (18) of the transmission wherein said first power range corresponds to a first forward travelling range in which the input power is transmitted via said variator (5) to said output shaft (17) and said planetary gearing (18) revolves as a unit and in the second power range which corresponds to a range of higher forward traveling speeds, and said variator (5) and said planetary gearing (18) are disposed consecutively and the exit of said variator is connected via an input connection (12) containing a ratio step with a shaft (14) which is operatively connected with one component (19) of said planetary gearing (18), wherein on said variator (5) is connected to input shaft (2) by a wet running multidisc clutch and in the range of higher forward traveling speed the input power is transmitted to said output shaft (17) via said planetary gearing (18) wherein in said planetary gearing (18) a division of power takes place and over said variator (5) an idle power circulates which is added to the input power in said main shaft (4) of said variator (5); wherein said variator (5) and said planetary gearing (18) are disposed coaxially horizontally and the exit of said variator is connected via a driving connection (12) with the shaft (14) which is operatively connected via transmission step (15, 16) with said one component (19) of said planetary gearing (18) and wherein a clutch (23) is inserted between said main shaft (4) of said variator (5) and an intermediate shaft (22), said intermediate shaft (22) being connected with said planetary gearing (18).

2. The transmission according to claim 1, wherein upon attaining the end position of said variator (5) with a ratio at high speed, a synchronous change over takes place between the range of lower and the range of higher forward travel speeds and vice versa.

3. The transmission according to claim 1, wherein said planetary gearing (18) has a first clutch (20) which acts as bridge clutch.

4. The transmission according to claim 3, wherein said planetary gearing (18) has a second brake (24) with which one component (21) of said planetary gearing (18) can be fastened to a transmission housing (25).

5. The transmission according to claim 1, wherein the planetary gearing (18) is directly connected via transmission gearing with said output shaft (17).

6. The transmission according to claim 4, wherein said first clutch (20) and said second brake (24) are structurally combined with said planetary gearing (18).

\* \* \* \* \*